Figure 8:
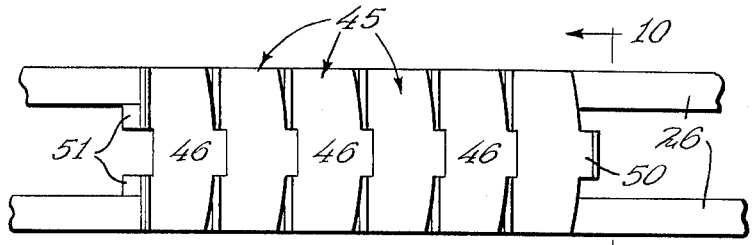

July 26, 1966  R. H. KAMPFER  3,262,550
CONVEYOR CHAIN
Filed May 11, 1964  2 Sheets-Sheet 1
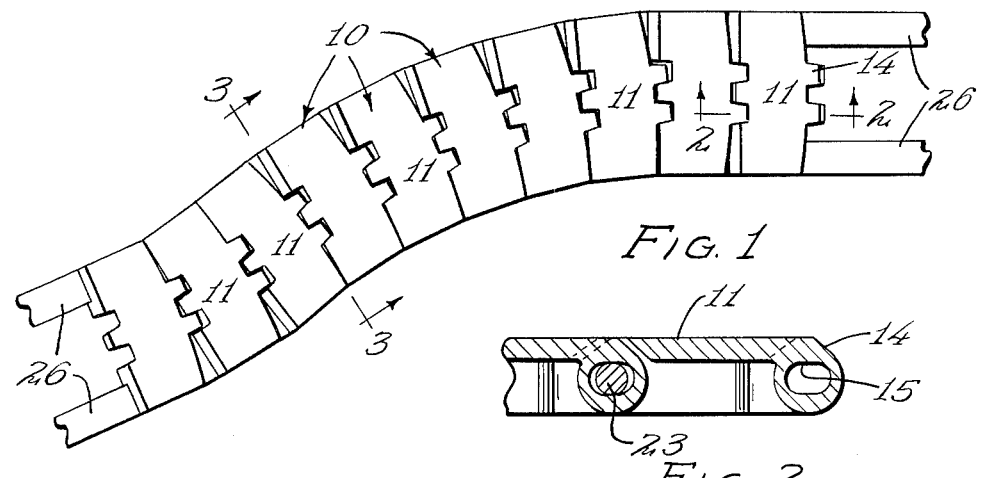
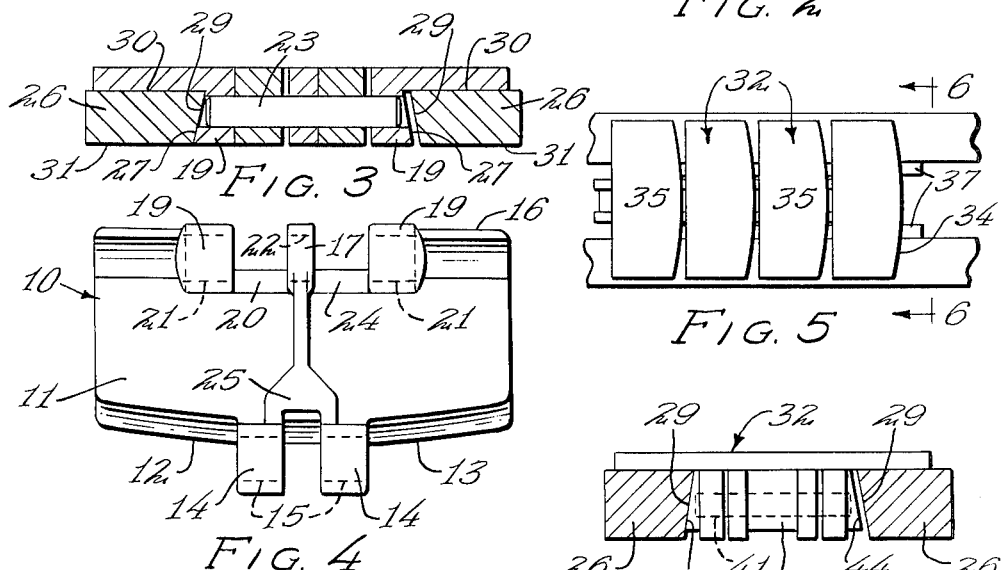
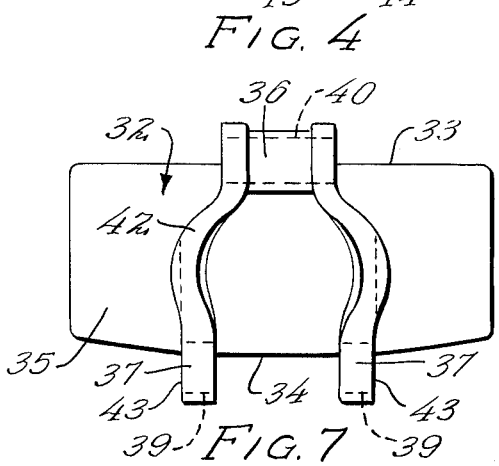
INVENTOR
RICHARD H. KAMPFER
BY
ATTORNEY July 26, 1966 R. H. KAMPFER 3,262,550
CONVEYOR CHAIN Filed May 11, 1964 2 Sheets-Sheet 2

INVENTOR
RICHARD H. KAMPFER
BY
ATTORNEY

United States Patent Office 3,262,550
Patented July 26, 1966

3,262,550
CONVEYOR CHAIN
Richard H. Kampfer, St. Paul, Minn., assignor to Conveyor Specialties Company, Ramsey, Minn., a corporation of Minnesota
Filed May 11, 1964, Ser. No. 366,444
6 Claims. (Cl. 198—189)

This invention relates to an improvement in Conveyor Chain, and deals particularly with a type of endless conveyor chain which may be directed about a tortuous path.

Conveyor chains of one type or another are often used in dairies, bottle plants, and in various packing plants for conveying bottles, jars, cans, cartons, and the like from one point to another. In some instances, it is desirable to guide conveyor chains about curved paths. Some difficulty has been experienced in producing conveyors of this type due to the fact that the pull on the links of the chain tends to disengage the chain from the guard rails. Conveyor chains of the type in question are usually driven from a single point so that at least the flight of the chain which is acting to support the articles conveyed is under constant tension. Accordingly, when the chain travels about a curved path, the tension of the chain has a tendency to cause the chain to tilt out a horizontal plane or else to raise out of engagement with the guide rails between which it extends. It is an object of the present invention to provide a chain which will not become accidentally disengaged from the guard rails.

Conveyor chains of the type in question, but designed to travel along straight paths have been produced in many forms. Many such chains comprise generally rectangular flat plates which may be made of plastic or other material with lugs projecting from the under surface. The lugs are positioned adjoining one edge of each plate, may alternate with lugs adjoining the opposite edge of the next adjacent plate and a pivot pin may extend through each set of lugs to pivotally connect the links. In other words, the lugs may interfit together in the same manner as conventional hinge plates for connection by a hinge pin. By slotting or elongating the apertures through the lugs on one side of each plate, and by providing a curved or inclined edge on each plate rather than a straight edge, the various plates may assume an angle relative to one another, so that the chain may travel along an arcuate path having a vertical center of arcuation.

I have found that by forming the lugs of the patents so that the outer sides of these lugs incline at an angle to the vertical, and by correspondingly tapering the sides of the guide rails, the previous difficulties may be eliminated. In other words, by making the lug structure wider at the bottom than at the top, the tendency for the pull of the chain to tilt the links between the guide rails which was previously experienced in structures of this type may be eliminated, and the chain may be guided along a tortuous path with no difficulty.

These and other objects and novel features of the present invention will be more clearly and fully set forth in the following specification and claims.

In the drawings forming a part of the specification:
FIGURE 1 is a top plan view of a conveyor chain traveling along a curved path.
FIGURE 2 is a vertical sectional view through portions of two adjoining chain links, the position of the section being indicated by the line 2—2 of FIGURE 1.
FIGURE 3 is a vertical section transversely through the guide rails and conveyor chain, the position of the section being indicated by the line 3—3 of FIGURE 1.

Figure 9:
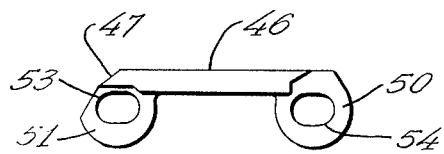
Figure 10:
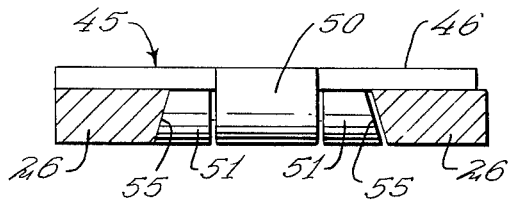
Figure 11:
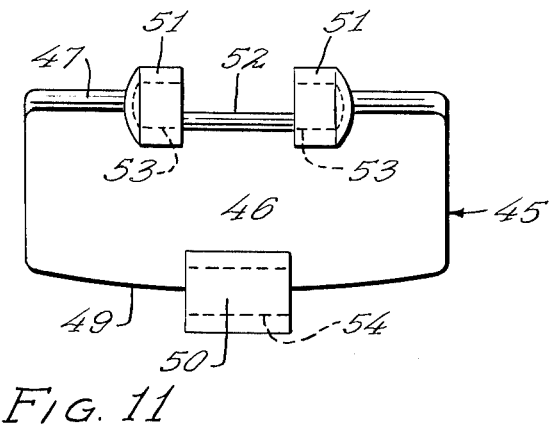

FIGURE 4 is a bottom plan view of one of the links forming the chain.
FIGURE 5 is a top plan view of a modified form of conveyor chain.
FIGURE 6 is a vertical sectional view through the chain guide rails, showing one of the links of the chain in elevation, the position of the section being indicated by the line 6—6 of FIGURE 5.
FIGURE 7 is a bottom plan view of one of the links shown in FIGURES 5 and 6.
FIGURE 8 is a plan view of a modified form of conveyor chain.
FIGURE 9 is a side elevation view of one of the links shown in FIGURE 8.
FIGURE 10 is a vertical sectional view through the guide rails showing the link in elevation.
FIGURE 11 is a bottom plan view of one of the links shown in FIGURES 8 through 10.

The conveyor chain illustrated in FIGURES 1–4 of the drawings is preferably formed of a plastic material such as Delrin Acetal Resin produced by Du Pont. As is indicated in the figures shown in the drawings, each link 10 includes a generally flat top plate 11 having a rear or trailing edge 12 which is slightly rounded so that the side edges of the plates are slightly reduced in length. Normally, the rear edges 12 are beveled upwardly and rearwardly as indicated at 13. A pair of spaced lugs 14 are arranged on opposite sides of the transverse center of the link and are apertured or slotted as indicated at 15. The apertures 15 are elongated longitudinally of the direction of movement of the links for the purpose of providing a predetermined angularity between adjoining links.

The forward edge 16 of the link-plate is provided with a central downwardly projecting lug 17 and a pair of laterally spaced lugs 19 on opposite sides of the central lug 17 and spaced therefrom a distance somewhat in excess of the width of the lugs 14. The plate 11 is notched as indicated at 20 between the laterally spaced links 19 to accommodate the lugs 14 of an adjoining link and to permit the links to be in closely spaced relationship. The links 19 are provided with aligned cylindrical apertures 21, and the central lug 17 is provided with a similar cylindrical aperture 22. The three apertures are axially aligned to accommodate a pivot pin which is indicated in FIGURE 3 at 23. The edge 20 of the notch is beveled as indicated at 24 to accommodate the lugs 14 of the next adjoining link.

In the specific form of link illustrated in FIGURES 1–4, a reinforcing web 25 connects the central forward lug 17 with the rear lugs 14 to add to the strength. The conveyor chain comprises a series of links of the type described pivotally connected by the pivot pins 13. The chain is propelled by engagement of the links with sprockets, the sprockets engaging between the spaced lugs. The links are normally supported by a pair of spaced guide rails 26 which lie outwardly of the links and engage the under surface of each of the plates 11. Due to the particular quality of the plastic of which the links are made, the links will usually slide over the guide bars with no lubrication necessary. As indicated in FIGURE 1 of the drawings, the conveyor chain links may travel about a curved path due to the rounding or tapering of the trailing edge 12, and due to the longitudinal elongation of the apertures 15 in the lugs 14. In other words, sufficient play is provided so that the various plates may be angularly related, or so that their forward edges 16 may be angularly related rather than parallel as is usually the case in chains of this type.

When a chain of the type in question is moved through its path of movement, there is obviously tension on the chain due to the frictional effect of the links sliding over the guide bars which is increased by the weight of the objects placed upon the chain. This tension creates a tendency for the chain to be disengaged from the guide rails as it travels about the curve. The tension on the chain tends to straighten out the chain, causing a tendency for the links to tilt out of their normal horizontal plane. I have found that if the outer side edges of the forward lugs 19 are properly angled, this difficulty can be eliminated. With reference to FIGURE 3 of the drawings, it will be noted that the side edges 27 of the lugs 19 are formed on planes arranged at perhaps fifteen degrees from the vertical so that the lower extremities of the lugs 19 are wider than the upper extremities of these lugs. It would also be noted that the inner opposed surfaces 29 of the guide rails 26 are also arranged at an angle relative to the vertical, the angle being on the order of fifteen degrees from a vertical plane. As a result, the cross sectional area between the guide rails is trapezoidally shaped with the upper surfaces 30 of the rails 26 closer together than the inner opposed edges of the lower surfaces 31 thereof. With this arrangement, the tendency for the chain links to tilt is obviated. As will be understood, the pull upon the chain occurs at the level of the axis of the pivots 23 which is below the level of the upper surfaces 30 of the guide rails 26. The pull on the chain then causes the lugs 19 which engage the curved rail surface 26 which is of shorter radius thereby holding the links from tilting.

The chain illustrated in FIGURES 5, 6 and 7 of the drawings is made up of links of slightly different shape from those disclosed in FIGURES 1-4, which are designed for the same result. This chain is made up of links 32 having a straight forward edge 33 and a curved or tapered rear edge 34 so that the plates 35 forming the upper surfaces of the links are somewhat narrower at their side edges than at their center portions. A lug 36 projects downwardly from the forward edge 33 and projects somewhat beyond the edge 33 as indicated. The links 32 also include a pair of spaced lugs 37 projecting downwardly from the plates 35 along the rear edge thereof and project beyond the rear edge 34. The lugs 37 are spaced apart a distance sufficient to freely accommodate the lug 36 of an adjoining link therebetween. The lugs 37 are provided with axially aligned cylindrical apertures 39 extending therethrough and the lug 36 is provided with an aperture 40 therethrough which is longitudinally elongated. Thus when the lugs of one link are connected to the lugs of the next by means of a pivot pin 41, the apertures 40 provide sufficient play to permit one lug to be angled relative to the other.

The forward lug 36 is connected to the rear lug 37 by a pair of reinforcing ribs 42 which also project downwardly from the under surface of the plates 35. The center portions of these ribs extend slightly beyond the planes of the outer surfaces 43 of the spaced lugs 37. As is indicated in FIGURE 6 of the drawings, the outer opposed surfaces 44 of the mid portions of the ribs 42 are formed on an angle with respect to the vertical, these ribs being wider at their lower edges than at their juncture with the plate 35. The chain links 32 are used in conjunction with rails 26 similar to those previously described and having upwardly and inwardly inclined inner surfaces 29.

This structure functions in the same manner as the chain links previously described. The various links may assume a predetermined angularity relative to one another, and the links are held against the guide rails by engagement of the inclined surfaces 44 of the ribs 42 with the guide rail surfaces 29.

FIGURES 8-11 disclose a third modified form of chain link used for forming the conveyor chains. The links 45 shown in these figures include flat plates 46 having a straight forward edge 47, and a curved or angled rear edge 49. A lug 50 projects downwardly from the rear edge of the under surface of the plate 46 and extends rearwardly therefrom. A pair of spaced lugs 51 project downwardly from the forward edge 47 of each plate 46, a portion of the plate between the lugs 51 preferably being notched as indicated at 52. The lugs 51 are provided with axially aligned cylindrical apertures 53 extending therethrough, and the lug 50 is provided with an aperture 54 extending therethrough which is elongated in the direction of travel of the links. Accordingly, the links may assume a predetermined angularity therebetween, and at the same time provide a substantially continuous upper surface.

As indicated in FIGURE 10 of the drawings, the side edges 55 of the lugs 51 are arranged at an angle to the vertical so that the lugs are wider at their lower extremity than at their point of juncture with the plate 46. The operation of this chain is virtually identical with the operation of the chains previously described.

In accordance with the patent statutes, I have described the principles of construction and operation of my improvement in Conveyor Chain, and while I have endeavored to set forth the best embodiment thereof, I desire to have it understood that changes may be made within the scope of the following claims without departing from the spirit of my invention.

I claim:
1. A conveyor chain in combination with a supporting rail structure, the chain including
a series of one piece plastic links,
a plate on each of said links adapted to ride over the surface of said rail structure for support thereby,
lugs projecting downwardly from said plates and into overlapping relation with the lugs of the adjoining links,
pivots pivotally connecting said overlapping lugs and having their axes parallel to the surfaces of said plates and at substantially right angles to the direction of travel of said links,
said lugs at one end of each link including apertures which are elongated in the direction of travel of the links to permit relative angularity between said links in a direction substantially normal to the surfaces of said links,
said lugs having inclined outer surfaces and being wider at the surfaces thereof most remote from said plates than at their junctures with said plates in a direction transverse to the direction of travel of said links,
said rail structure having an inner edge inclined to substantially fit the inclination of said outer surfaces of said lugs.

2. The structure of claim 1 and in which said plates taper in width toward their side edges.

3. A conveyor chain in combination with a supporting rail structure including a pair of spaced generally parallel rails,
said chain including a series of one piece plastic links,
a plate on each of said links having lateral edges slidably supported on said rails,
means projecting downwardly from said links into overlapping relation with the similar means from adjoining links,
pivots connecting said projecting means of adjoining links, the axes of said pivots being substantially parallel to the surfaces of said plates and extending transversely to the direction of travel of said links,
said downwardly projecting means having inclined lateral side edges which are relatively narrow near their juncture with the plates and which are relatively wide farther from said plates,
said spaced rails having downwardly and outwardly diverging inner edges slidably engageable with the lateral side edges of said downwardly projecting means.

4. The structure of claim 3 and in which said plates are substantially in contact centrally between their lateral edges, and decrease in width toward their lateral edges.

5. A conveyor chain in combination with a supporting rail structure including a pair of spaced generally parallel rails which follow a sinuous path, said chain including
  a series of links,
  each link including a plate supported by and between said spaced rails,
  means projecting downwardly from said plates and arranged in overlapping relation with the similar means of adjoining plates,
  pivots extending through the overlapping portions of said downwardly projecting means, the pivots having their axes generally parallel to the surfaces of said plates and extending transversely of the direction of movement of said links,
  the downwardly projecting means at one end of each said link including an aperture which is elongated in the direction of travel of said links to permit relative angularity between said links on an axis generally normal to said plates,
  said downwardly projecting means having inclined lateral side edges which are relatively narrow near their juncture with the plates and which are relatively wide farther from said plate
  said spaced rails having downwardly and outwardly diverging inner edges slidably engageable with the lateral side edges of said downwardly projecting means.

6. The structure of claim 5 and in which said plates are substantially in contact centrally between their lateral edges and decrease in order toward their lateral edges.

References Cited by the Examiner
UNITED STATES PATENTS

| | | | |
|---|---|---|---|
| 2,256,005 | 9/1941 | Wood | 198—189 |
| 2,733,906 | 2/1956 | Joy | 198—189 |
| 3,066,549 | 12/1962 | Benjamin | 198—189 |

EVON C. BLUNK, *Primary Examiner.*

RICHARD E. AEGERTER, *Examiner.*